United States Patent
Gregory, Jr. et al.

[11] Patent Number: 5,818,960
[45] Date of Patent: Oct. 6, 1998

[54] CHARACTERIZATION CALIBRATION

[75] Inventors: H. Scott Gregory, Jr., Bedford; Robert Franklin Poe, Charlestown; Douglas George Walker, Boston, all of Mass.

[73] Assignee: Eastman Kodak Company, Rochester, N.Y.

[21] Appl. No.: 407,785

[22] Filed: Mar. 20, 1995

Related U.S. Application Data

[63] Continuation of Ser. No. 86,978, Jul. 2, 1993, abandoned, which is a continuation-in-part of Ser. No. 58,082, May 4, 1993, abandoned, which is a division of Ser. No. 832,358, Feb. 7, 1992, Pat. No. 5,208,911, which is a division of Ser. No. 717,099, Jun. 18, 1991, abandoned.

[51] Int. Cl.$^6$ ............................... G06K 9/00; G02B 5/12
[52] U.S. Cl. ..................... 382/167; 358/504; 358/518; 358/523; 345/431
[58] Field of Search ................................. 382/100, 162, 382/167; 358/504, 518, 523; 395/109, 131; 345/431; 364/556, 571.01

[56] References Cited

U.S. PATENT DOCUMENTS

| | | | |
|---|---|---|---|
| 4,477,833 | 10/1984 | Clark et al. | 358/80 |
| 4,488,245 | 12/1984 | Dalke et al. | 364/526 |
| 4,496,968 | 1/1985 | Pugsley | 358/80 |
| 4,561,016 | 12/1985 | Jung et al. | 358/527 |
| 4,736,244 | 4/1988 | Shiota et al. | 358/76 |
| 4,805,226 | 2/1989 | Guebey | 382/27 |
| 4,850,027 | 7/1989 | Kimmel | 382/49 |
| 4,901,258 | 2/1990 | Akiyama | 364/577 |
| 4,929,978 | 5/1990 | Kanamori et al. | 358/520 |
| 4,941,038 | 7/1990 | Walawit | 358/504 |
| 4,941,039 | 7/1990 | E'Errico | 358/80 |
| 4,958,220 | 9/1990 | Alesssi et al. | 358/76 |
| 4,965,844 | 10/1990 | Oka et al. | 382/44 |
| 4,992,862 | 2/1991 | Gabor | 358/518 |
| 5,053,866 | 10/1991 | Johnson | 358/504 |
| 5,208,911 | 5/1993 | Newman et al. | 395/131 |
| 5,309,257 | 5/1994 | Bonino et al. | 358/504 |
| 5,398,121 | 3/1995 | Kowalewski et al. | 358/523 |
| 5,500,921 | 3/1996 | Ruetz | 395/109 |
| 5,539,540 | 7/1996 | Spaulding et al. | 358/518 |

OTHER PUBLICATIONS

Foley et al, "Fundamentals of Interactive Computer Graphics". Addison–Wesley Publishing Co., 1982, Chapter 7, pp. 245–266.

Hunt, "Measuring Colour," Ellis Horwood Limited, 1987, Chapter 3, pp. 53–73.

*Primary Examiner*—Leo Boudreau
*Assistant Examiner*—Bhavesh Mehta
*Attorney, Agent, or Firm*—Peyton C. Watkins

[57] ABSTRACT

The output response of an image processing system having a color printer and a color printer characterization is linearized by printing a target image having target patches of differing color densities. After measuring printed patches, a calibration transform is generated that incorporates the relationship between requested and measured color densities. The calibration transform is then composed with the characterization, calibrating the printer characterization.

21 Claims, 8 Drawing Sheets

KEPS 4 colorant linearization target (400% stabli.), this end prints last.

| PATCH NUMBER: 6-M,A | Verify Target.4Color.rOPs-Linearize | | | ACTUAL VALUE: 0.445 | |
|---|---|---|---|---|---|
| | A | B | C | D | E |
| 1-L | | | | | |
| 2-M | | | | | |
| 3-Y | | | | | |
| 4-K | | | | | |
| 5-C | 0.554 | 0.165 | 1.031 | 0.402 | 2.048 |
| 6-M | 0.445 | 0.183 | 0.858 | 0.338 | 1.759 |
| 7-Y | 0.357 | 0.116 | 0.734 | 0.253 | 1.845 |
| 8-K | 0.575 | 0.198 | 0.87 | 0.364 | 1.487 |
| 9-C | 1.724 | 0.356 | 0.981 | 0.146 | 0.564 |
| 10-M | 1.413 | 0.312 | 0.81 | 0.168 | 0.465 |
| 11-Y | 1.397 | 0.221 | 0.694 | 0.111 | 0.352 |
| 12-K | 1.288 | 0.319 | 0.808 | 0.181 | 0.532 |
| 13-L | | | | | |
| 14-M | | | | | |
| 15-Y | | | | | |
| 16-K | | | | | |

FIG. 6

CHARACTERIZATION CALIBRATION

RELATED APPLICATIONS

This is a Continuation of U.S. application Ser. No. 08/086,978, filed 2 Jul. 1993 now abandoned, which is a continuation-in-part of U.S. patent application Ser. No. 08/058,082 entitled "Color Image Processing System for Preparing a Composite Image Transformation Module for Performing a Plurality of Selected Image Transformations," filed May 4, 1993, now abandoned which is a division of U.S. application Ser. No. 07/832,358, filed Feb. 7, 1992, now issued as U.S. Pat. No. 5,208,911, which is a division of U.S. application Ser. No. 07/717,099, filed Jun. 18, 1991, now abandoned.

FIELD OF THE INVENTION

The invention relates to the general field of electronic processing of color images, and in particular to methods and apparatus for calibrating color characteristics of printers and output devices.

BACKGROUND

Color image processing systems typically include a combination of devices, including input devices (e.g., a scanner), image manipulation devices (e.g., a workstation) and output devices (e.g., a printer). When combining diverse input/output devices, consistency of color reproduction is desirable. For example, an operator who modifies an image to achieve particular color goals would like the printed image to have the same colors as a version seen on a CRT monitor. In another example, an operator would like an image to have nearly the same colors when printed on different printers, or when printed at different times on the same printer. Here, the phrase "same colors" implies "visual match".

This goal can be achieved by determining the relation between the command code values used to drive each device and the visual colors reproduced by that device in response to these values. This relation can then be inverted mathematically to establish a relation between visual colors and the command codes required to obtain these colors from the device. The process of determining this relation is known as "color characterization". If the color peripheral devices in a system have been characterized, it is possible to reproduce the same colors on these devices by selecting, for each device, the command code values that are required to reproduce those colors. The desired colors in an image can be specified in a device-independent, visual color space. The conversion from the visual color space to the command code values for each device is based on the characterization of that device. Examples of such visual color spaces are the "CIE-based color spaces" employed in PostScript® Level 2.

Color characterization generally involves the production of color patches by a given device in response to selected command code values. These patches are then analyzed in a colormeasurement laboratory, employing suitable optical instruments, such as spectroradiometers, to determine the optical properties of the patches. Calculations based on an understanding of human color vision can then be applied to the optical data to determine the visual colors of the patches. These techniques belong to the science of colorimetry.

The color-reproduction characteristics of printers and other devices vary considerably. Some of this variation is due to the different printing processes or technologies employed, such as thermal wax transfer, dye sublimation, electrophotography, ink jet, offset lithography, or gravure. Some of these processes use continuous-tone deposition of the colorants, while others involve halftone screening or dithering of small dots in specific patterns. Even when devices use the same technology, considerable variation can be found from printer to printer due to the inevitable variability of the manufacturing process. In fact, the characteristics of a single printer will change or drift in the course of time, owing to aging and wear of parts and materials, temperature and humidity sensitivities, etc.

Unfortunately it is not practical to provide characterizations and periodic re-characterizations for large numbers of individual devices. Device characterization that takes into account many aspects of the device (screening, dot gain, ink spectral reflectance, . . . ) tends to require expensive, precision instrumentation not typically available to most endusers of a color system. Thus, a "standard" characterization for a particular model printer tends to be generated once "at the factory" of the printer manufacturer or by an after-market supplier of characterizations. One example of a characterization is a Device Profile sold by Kodak Electronic Printing Systems, Inc. as part of its Precision Color Management system of products.

Device characterization significantly improves accuracy and repeatability of color generation by compensating for differences among different models of devices. However, even within one model of device, individual units exhibit characteristics that may differ over time (for the same unit) or that may differ from one unit of the same model to the next. Thus, after acquiring a particular model of printer and a characterization for that printer, end users may continue to suffer inaccuracies if the characteristic of the particular unit differs from the characteristic for which the "standard" characterization was made, or if the characteristics of the end user's particular unit drift over time.

SUMMARY OF THE INVENTION

The invention provides a practical means of generating color characterizations for individual color printers and similar devices by combining a standard characterization with specific calibrations for these devices.

For each colorant channel of the device—typically, red, green, and blue (RGB), or cyan, magenta, yellow, and black (CMYK)—a sequence of interface code values is defind, each of which is associated with a particular, measurable response of the device. The response is specified in advance by the designer of the interface and, accordingly, is called the "aim response". The response is "measurable" by means of an inexpensive instrument, such as a densitometer, which is capable of determining some optical property of the device's printed output, such as Status A density, which effectively monitors the condition of the printer.

In practice, a standard "target" image is printed by driving the printer with a sampling of the possible command code values in order to obtain samples of the printer output. The printer output samples are measured (e.g., using a standard densitomer), and the measured values are entered into the imaging system computer. The computer can then establish the relation between command code value and measured response for each colorant channel. The inverse of this relation maps response to command value. When this relation is applied to the aim responses for the interface code values, the computer creates a distinct transformation from the interface code values to the device's command code values. The device is now calibrated, in the sense that a given interface code value passed through this transformation will yield a command code value which will drive the device to produce a print satisfying the aim response for that interface code value. When viewed from the internal interface, the device is "on aim"—i.e., equivalent to a standard printer of that unit.

BRIEF DESCRIPTION OF THE DRAWINGS

FIG. 6 is an illustration of a data input screen for manually entering density data measured from a print of the target of FIG. 5;

DETAILED DESCRIPTION

The present invention divides characterization into two component parts: (a) a "standard" characterization for a particular model of printer, which can be generated once "at the factory" of the printer manufacturer or by an after-market supplier of characterizations, and (b) an adaptive part, which adjusts the characterization to the actual characteristics of a specific unit of that model and which can be generated inexpensively by the end user as often as required. The adaptive part makes use of common techniques that fall under the heading of "device calibration". When used to adapt a standard characterization to an actual device, it is referred to here as a "characterization calibration". The standard characterization accounts for the variations in technology or design among printer models; the calibration accounts for the variations over time (for the same unit) or from one unit (of the same model) to the next. Furthermore, the calibration is intrinsically simpler than characterization, in that the former is based on an analysis of the individual colorant channels of the printer taken one at a time, whereas the latter must account for the interactions among the channels.

Conceptually, the standard part is connected to the adaptive part by defining a fixed interface, which is internal to the characterization (viewed as a whole). The standard characterization is embodied in a transformation from the desired visual colors (as specified in a visual color space) to the space of interface code values. The characterization calibration provides a transformation from the interface code values to the command code values for the device.

SYSTEM HARDWARE

A calibration in accordance with the present invention may be implemented on any electronic image processing system. One exemplary system is the Kodak Prophecy Color Publishing System™, a pre-press workstation for the acquisition and processing of high-resolution continuous tone color images for the printing and publishing industry.

Figure 1:
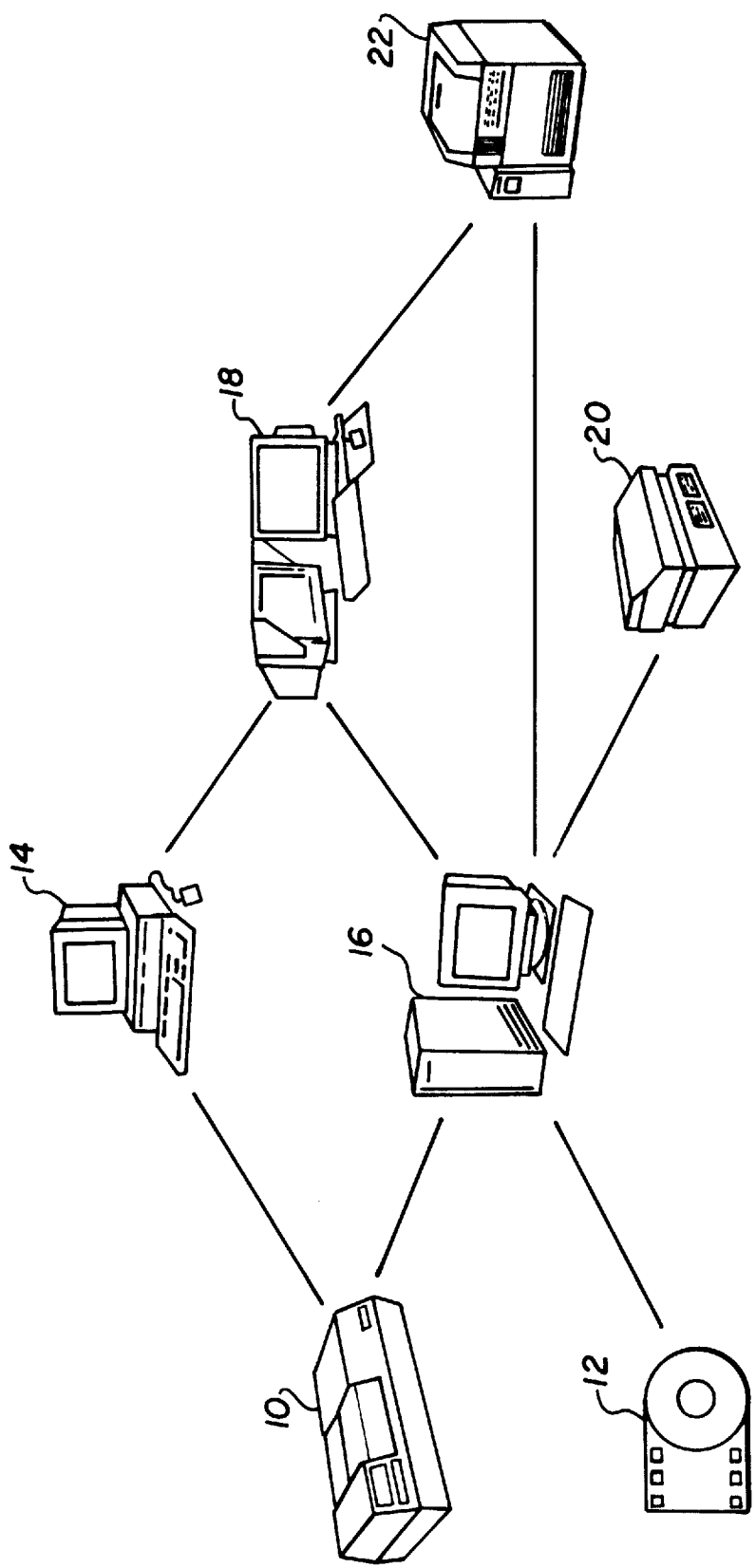
FIG. 1 is a block diagram of a system embodying the present invention.

FIG. 1 is a block diagram of a Prophecy™ system having a Sun 4™ series computer, with imaging accelerator, a 480×640 pixel interlaced color monitor and a 900×1180 noninterlaced monochrome monitor connected to a variety of inputoutput devices (optionally including a drum scanner, a Photo CD™ digital storage device, PCS 100 imaging station, a Macintosh™ workstation, a color proofer and a PostScript imagesetter). In order to provide consistent color reproduction, each interface to an I/O device is characterized. Printer interfaces can be calibrated in accordance with the present invention.

Of course, a wide variety of other hardware platforms that are suitable for image processing can benefit from the present invention, such as Macintosh and PC type desktop systems.

DEVICE CHARACTERIZATION

A device characterization can be thought of as a nonlinear mapping from a device-independent, visually-based, color space to a nonlinear device-dependent space that yields command codes for a printer such that the printer produces the desired colors.

In a preferred embodiment of the invention, a mapping or transform has a three-data-table representation that regulates a programmed computer used to process an electronic representation of an image. The transformation is physically made up of electronic circuitry operating on electronic signals that represent an image. Calibrations and characterizations may be physically located in a printer or in other processing equipment in the system, or even stored with individual images.

Figure 2:
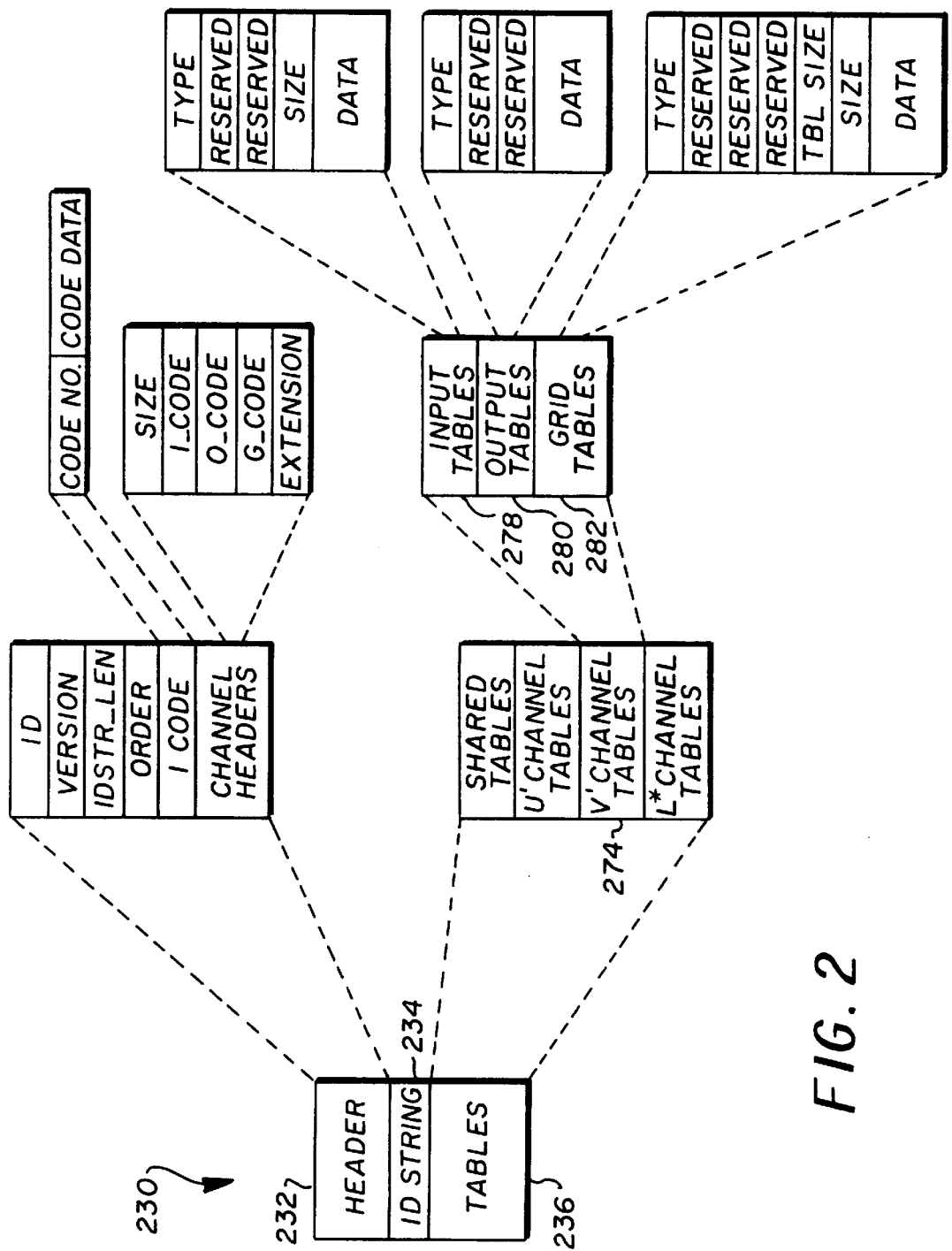
FIGS. 2 and 3 are illustrations of a transform definition, including details of an input table, a grid table, and an output table.
Figure 3:
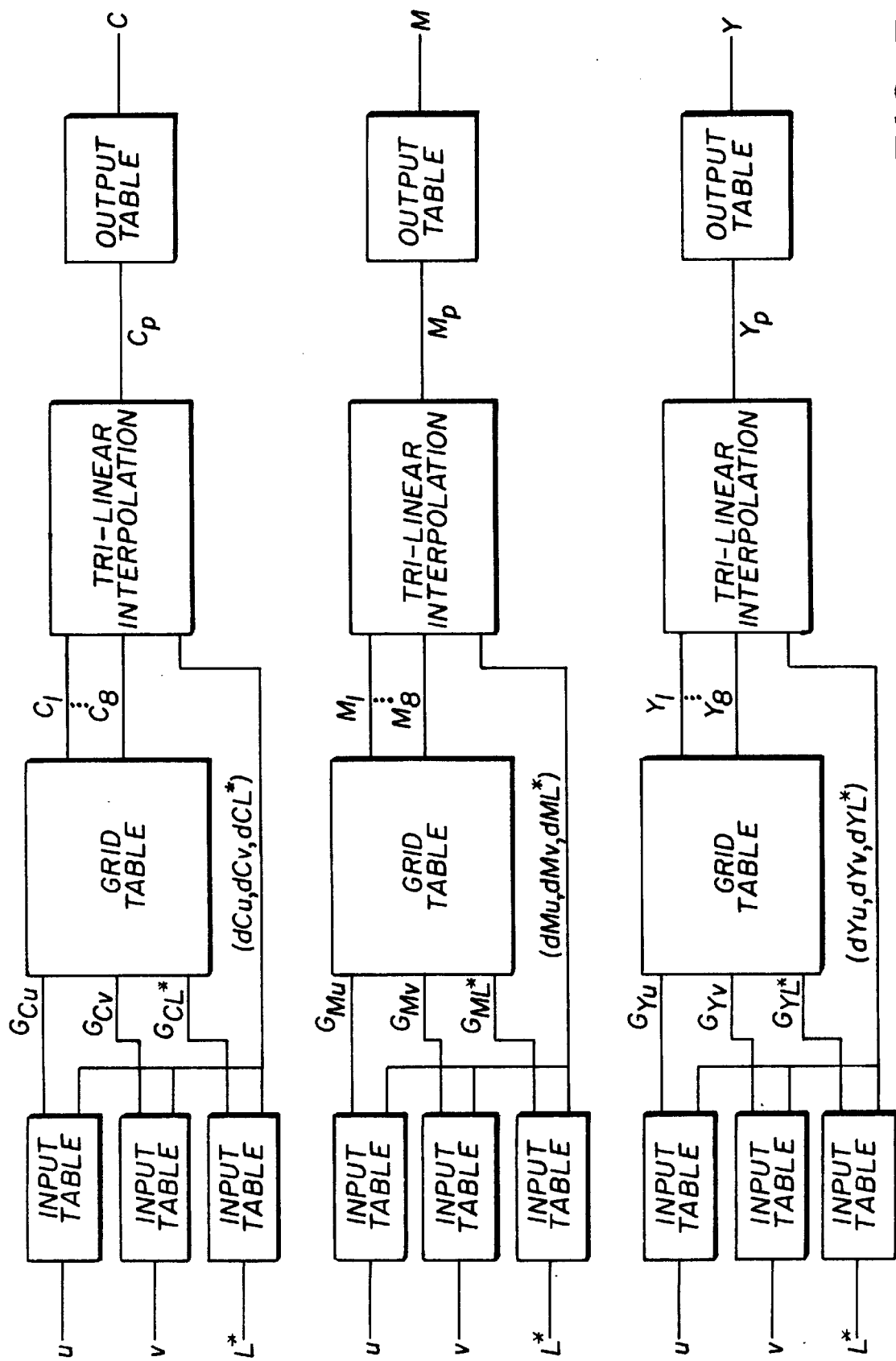

FIGS. 2 and 3 are illustrations of a preferred transform implementation, including details of an input table, a grid table, and an output table. The transform 230 is electronically stored with a header 232, an optional identification string 234 and tables 236. The transform has been described in detail in U.S. application Ser. No. 07/832,358, now issued as U.S. Pat. No. 5,208,911, which is incorporated here by reference. Salient points will be reiterated here for convenience to the reader.

The header 232 includes information for regulating the use of the transform, such as identifiers, codes identifying how to interpolate in the tables, size information defining the lengths of particular fields, etc. The optional ID string 234 includes information helpful in identifying the transform, such as a field with ASCII text description.

Most important are the input tables 278, the grid tables 282, and the output tables 280. The tables are grouped according to the color channels 274 of the input color space.

As shown in FIG. 3, each dimension of the output color space (e.g., C,M,Y) is a separate channel with potentially separate input tables, output table, and grid table. Each input table receives a scalar color value as an input and returns an output value that, in turn, is an entry (address) into one dimension of the grid table. The grid table returns several coefficients which are typically used for tri-linear interpolation to form an intermediate value that, in turn, is an entry into an output table. The output table then returns a final color scalar value that represents a modified color component of a pixel in a transformed image. The transform is applied to the color values of each and every pixel of an input image to generate modified pixels that form a modified output image. Of course, the tables take the physical form of information stored in computer, and the table look-up operations are performed by a computer processor operating in response to program instructions.

This three-table structure provides flexibility for representing a wide variety of transforms as a combination of two non-linear mappings (using the input and output tables) and a tri-linear interpolation process (using the grid tables). Each input table allows for one-dimensional non-linear mapping of an input color scalar into a relatively linear representation of the grid tables. The grid tables allow for an n-dimensional linear interpolation (where n equals the number of dimensions of a color space, typically three or four). The output table allows for one-dimensional mapping of the interpolated output color scalars into final output color commands.

By way of example, a single three-table transform may operate as follows to modify a scanned original image into a form suitable for printing. In this example, a scanner generates an array of pixels, each having three color components: red, green and blue (a three-dimensional color space referred to as RGB). The printer, however, prints with cyan, magenta, yellow, and black inks (a four dimensional color space referred to as CMYK). The transform of this example converts RGB input values into corresponding CMYK color values. The transformation is accomplished by combining a first transformation that relates the RGB space to a calorimetric reference space, with another transformation that relates the colorimetric reference space to the CMYK output space.

For each pixel, the three RGB components are used to enter the input tables of the first transformation. The pixels are then processed through the grid tables and output tables of the first transformation, at which point they are in a deviceindependent color space, such as u,v,L* (chrominance-luminance). Here, the device-independent color space is perceptually linear so that a numerical increment of color change in any part of the color space results in a perceptually uniform change in color.

The pixels, now in u,v,L* space, then are used to address the input tables of the second transformation. Tri-linear interpolation is performed in the C, M, Y, and K grid tables and the result from each interpolation is applied to the respective C, M, Y, and K output tables. The resulting pixels are in the CMYK color space appropriate for the given output device.

Transforms of this structure can be composed to form a single composite transform that is equivalent to sequential application of a series of individual transforms. In this example, the first transformation relating RGB to u,v,L* is composed with the second transform relating u,v,L* to CMYK in order to generate a composite transform which relates RGB to CMYK. The use of this composite transform allows the image pixels to be processed directly from RGB to CMYK space without the need to compute the u,v,L* representation of each pixel.

In this way, an imaging system can maintain many separate transforms, including input characterizations (for individual input devices), a "toolkit" of device-independent transforms (e.g., for correcting "washed-out" images), and output characterizations. When processing an image, an operator can quickly select, compose and apply groupings of transforms.

Kodak Electronic Printing Systems, Inc. of Billerica, Mass., provides characterizations in such a form for a wide variety of color printer models, such as a QMS™ ColorScript™ 100. During operation of a typical color station, a user will develop a wide variety of transforms for differing reasons other than ouput characterization. For example, color transforms allow an operator to "brighten" selected colors, change contrast, etc. An image will undergo a number of transformations, including an output characterization transform which attempts to ensure that the physical printer output matches the user's expectation.

A single device characterization for a particular model of printer reduces much of the variation that is otherwise caused by differences in printer models. For example, if a user prints an image on two different models of printers, both prints will have very similar color rendition as long as the image is transformed using the appropriate characterizations.

However, individual units of the same printer model may have slightly different characteristics, and a single printer's characteristics may drift over time. Therefore, using a single "factory" characterization for all units of the same model may still result in variations. These variations may be further reduced by calibrating the characterization as discussed below.

CALIBRATION

Generally, a characterization is made for a device on the assumption that all units of a particular device model behave similarly. The device for which the characterization produces the desired result, without need for calibration, is referred to as the "reference" device. The reference device may have a physical realization or it may be a description of a hypothetical device. The response of the reference device is used to define the aim to which all devices of the given model will be calibrated. For example, one could take a single unit of a printer model, assume that its characteristic is typical, and use its characteristic to define the aim. Alternately, one could take several units and develop an average characteristic which is used to define the aim. Most individual units will have characteristics that are close-to but different-from the reference device. Therefore, when applying the characterization to these individual units without also calibrating to the reference device, slight color errors may still result.

The calibration process measures some aspects of the response of an individual unit and (in a sense) modifies the standard characterization to more precisely reflect the individual unit. The calibration process can also be conceptualized as transforming the unit's individual characteristic to be more like that of the reference device.

The preferred method generates a calibration transform that is represented as a three-table transform having input tables, grid tables, and output tables. The input tables and grid tables are identity mappings (which do not alter data), while the output table maps the device's particular characteristics to the aim. The calibration transform can be sequentially applied with other transforms (including the standard characterization) or can be combined with the standard characterization to produce a calibrated characterization.

Figure 4:
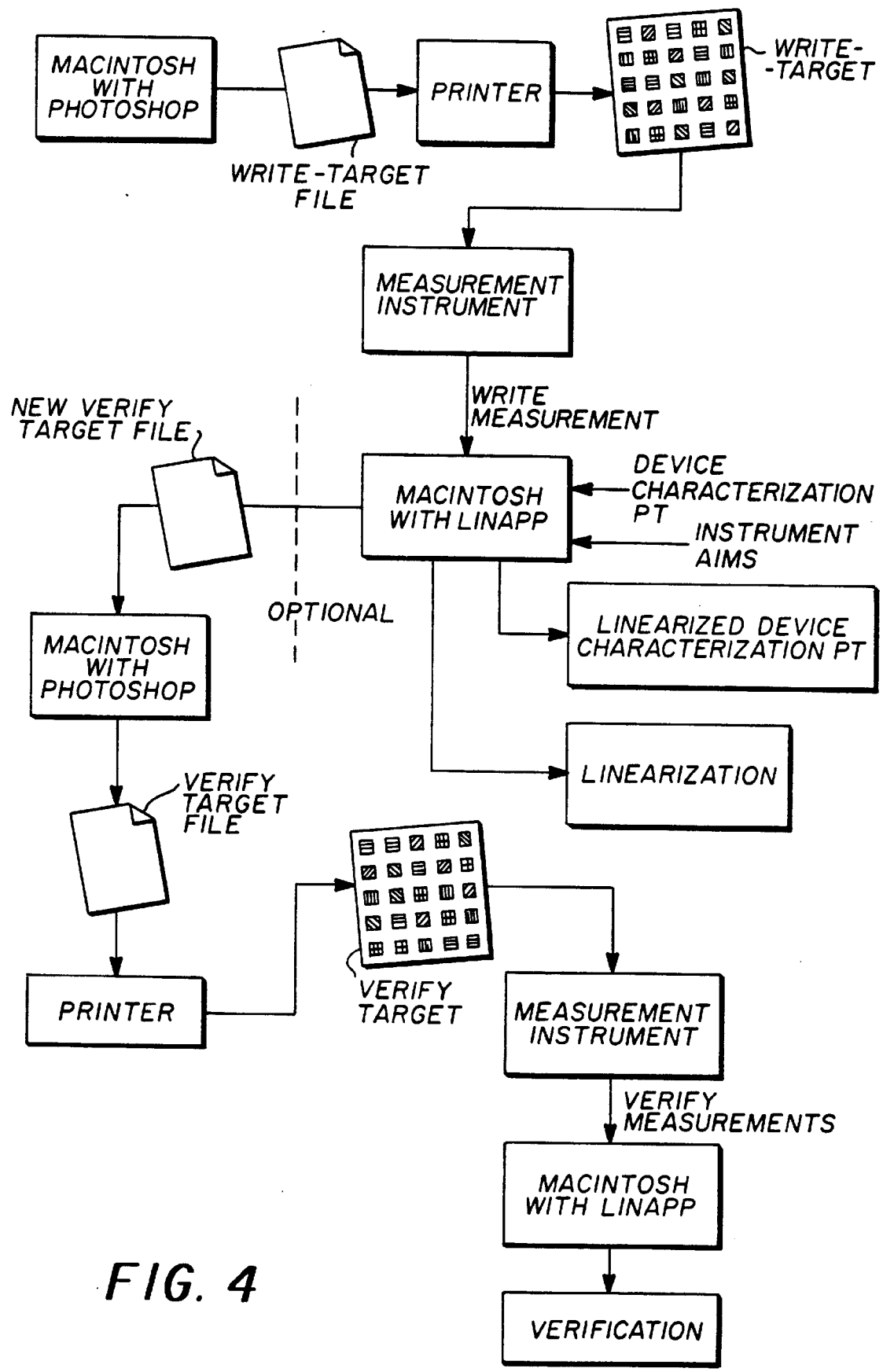
FIG. 4 is a flow diagram illustrating steps for calibrating a device according to the present invention.

FIG. 4 is a flow diagram illustrating steps for calibrating a characterization (in this example, a printer). Generally speaking, a standard "target" image is printed to obtain many different color samples of the printer output. The printed samples are measured (e.g., using a standard densitometer), and the measured values are entered into the imaging system computer. The computer compares the measured color values with the aim values for the target. The computer generates a transform that maps the measured values to the aim values. The transform, in turn, is used to update the printer characterization. Optionally, the process may be repeated using an existing calibration to verify or (if necessary) further improve the accuracy of the characterization.

Figure 5:
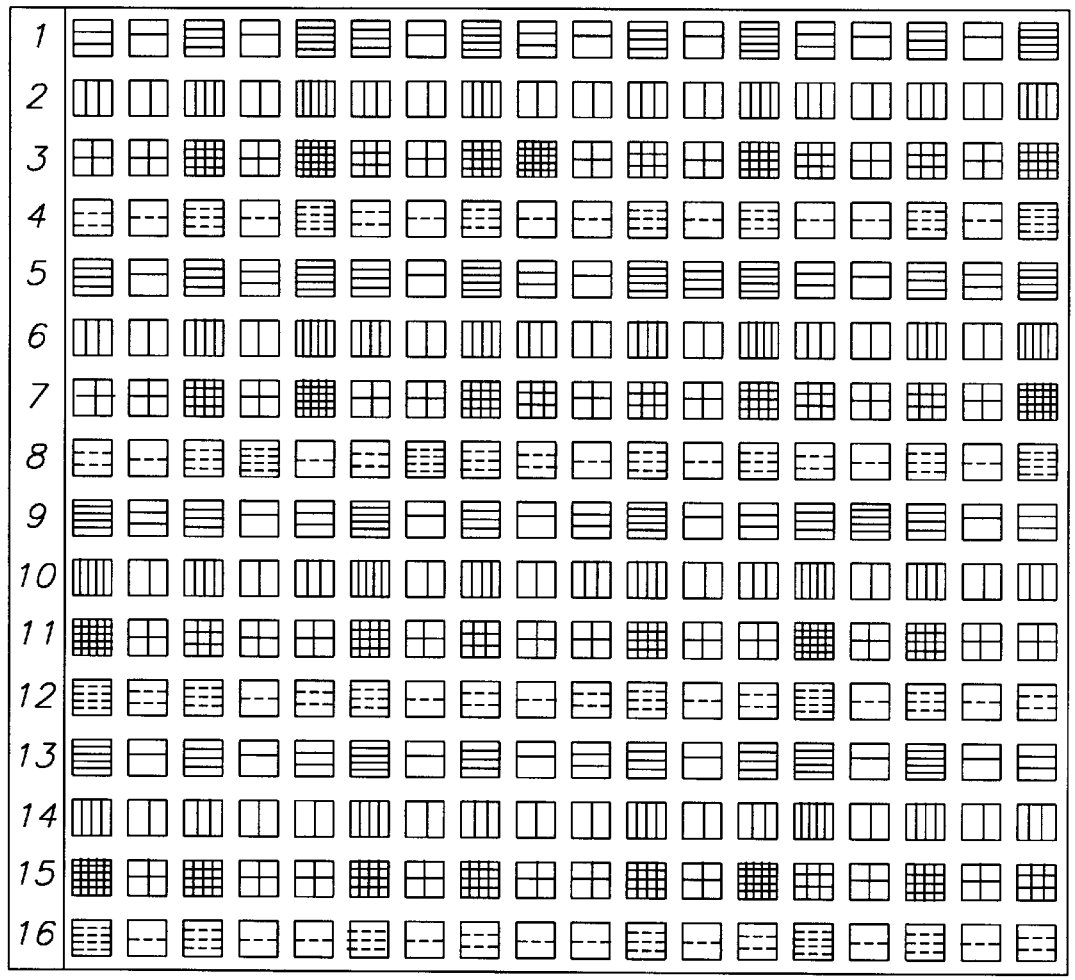
FIG. 5 is an illustration of a linearization target.

FIG. 5 is an illustration of a suitable sequence of patches. The target sequence has a series of 16 rows. Rows 1, 5, 9 and 13 each have 18 cyan color patches. Each patch has a distinct density. Rows 2, 6, 10 and 14 have magenta patches; rows 3, 7, 11 and 15 have yellow patches; and rows 4, 8, 12 and 18 have black patches. For each color, patches that are close in density are located separately on the target. Patches may be arranged in different order, or on separate pages with other images.

The particular number and size of patches may vary. Typical patches are about 0.25 to 0.5 inches square with about 36–72 nonequally spaced steps (in device code value).

There should be one set for each colorant, e.g., 3 for CMY, 4 for CMYK. It is customary to measure a colorant with a complementary filter when making measurements of the target with a densitometer. For example, cyan is measured with a red densitometer filter. By convention, black is measured with a green filter. The target may also be measured with a spectrophotometric device. Spectral data can be reduced mathematically to a density by integrating over wavelength using known techniques. On a three-colorant device, all colorants can be measured simultaneously by printing various levels of gray using equal amounts (in device codes) of the three colorants.

Some spatial non-linearities of printers that might otherwise distort target colors can be reduced by surrounding the patches with a noise pattern consisting of equal numbers of black and white pixels set alternately to the minimum and maximum code values. Thermal printers, for example, often have latency effects which cause areas on different parts of a page to have different density, even if printed with the same code value. This can be caused by residual heat in the print head. The alternating background pattern keeps the print head at a roughly constant temperature.

FIG. 6 is an illustration of a data input screen for manually entering density data for a printed target. After measuring the density of each color patch, the operator enters the measurements in a spreadsheet-like form. With this information, a software library routine analyzes the measurements and generates a calibration transform in a manner that will be discussed more fully below.

SMOOTHING

The measured values are a discrete set of points that may be corrupted by noise. In order to reduce the impact of noise and quantization, the preferred embodiment fits a B-spline curve to the measured data. The resulting B-spline is a weighted sum of predetermined B-spline basis functions. The weights are chosen to minimize a mean square error between the function and the data samples while also yielding a monotonic function.

Figure 7:
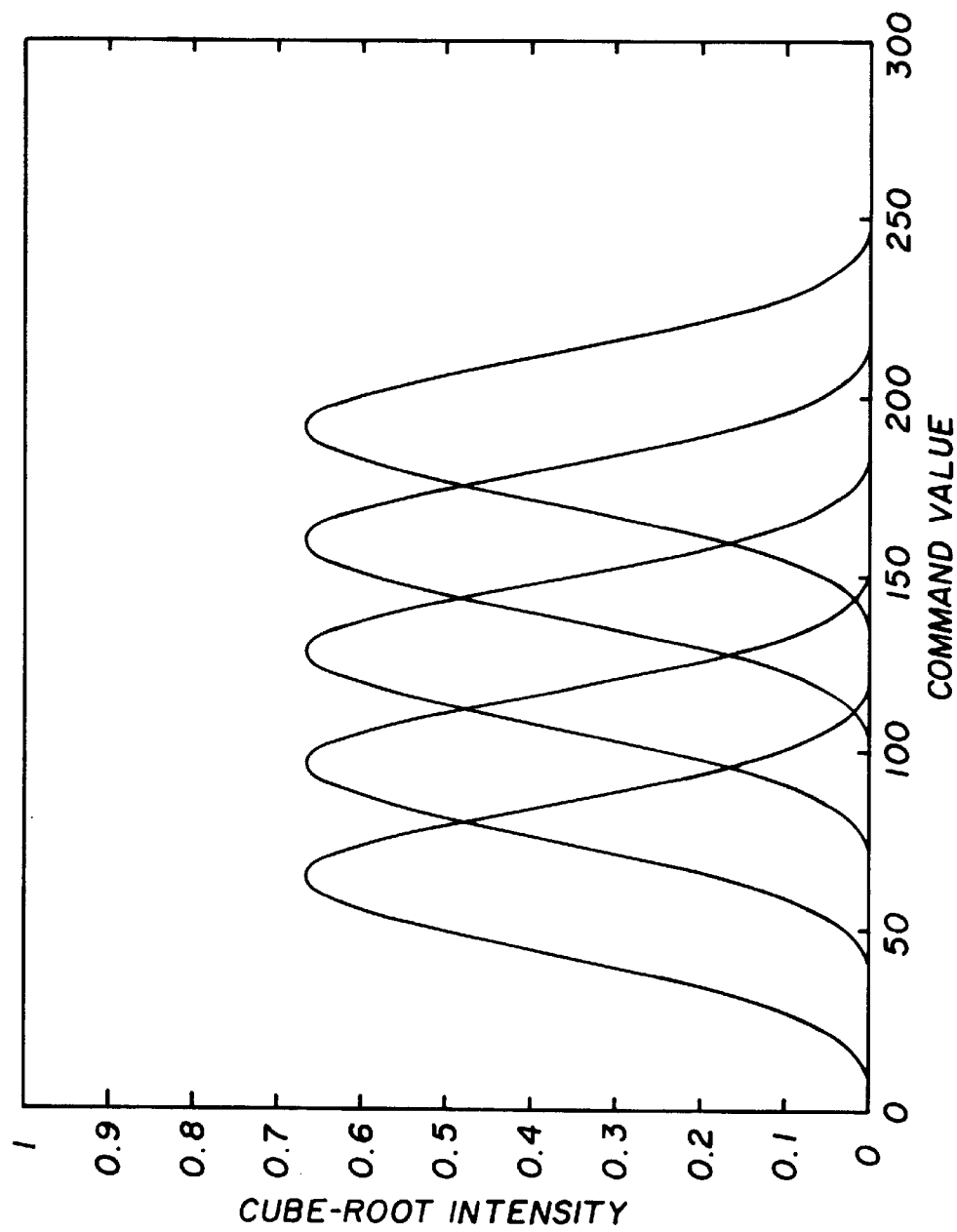
FIG. 7 is a plot illustrating basis functions of a B-spline function for smoothing data samples.

Each basis is a piecewise polynomial having non-zero values over a portion of the code value range. That is, the non-zero range of each basis function is divided into a number of polynomial segments. For each segment, the basis is equal to a single cubic polynomial. Adjacent segments may be represented by a different polynomial. The polynomial coefficients vary for each segment. The basis functions are continuous at the knots (segment boundaries) and provide an overall shape that is gaussian-like (bell shaped). Different basis functions peak in different parts of the code value range as shown in FIG. 7. The number of basis functions and the number of knots may vary according to the complexity of the behavior of the printer characteristic, and 8–24 basis functions are contemplated as typical. Background on use of spline functions can be found in C. DeBoor, A Practical Guide to Splines, Springer Verlag, N.Y., 1978.

It is desirable that the mean square error, representing the difference between the smoothing function and the measured data, have an equivalence to the visual perceptibility of this difference. Therefore, the preferred embodiment of the algorithm fits the curve using a metric which is proportional to the measured light intensity raised to the ⅓ power. This results in a metric which is more visually uniform than either density or the intensity itself.

It is also important that the resulting smoothing function be monotonic in order that the relationship between device command value and measured device response be invertible. In the preferred embodiment, the initial B-spline function is checked for monotonicity. The coefficients which describe the spline function are those which minimize the error metric or cost function described above. If the coefficients do not describe a monotonic function they must be altered and this, in turn, implies an increase in the error metric. Therefore, if the function is not monotonic, the vector space containing the coefficients is searched in order to find a solution which is both monotonic and has a relatively small value for the cost function. It is thus an optimization problem and software methods for solution are thoroughly described in the literature. See, for example, P. E. Gill and W. Murray, ed., Numercial Methods for Constrained Optimization, Academic Press, London, 1974.

Of course, the smoothing function need not be a B-spline. It is sufficient that the function be continuous and monotonic over the code value range. Nor is it necessary to fit the data to the function using a mean squared error cost function. Depending on the complexity of the characteristic and the accuracy required for each printer, other methods for fitting data to the function may be used.

In addition to smoothing, curve fitting the data reduces the number of color patches used. By printing a limited number patches (e.g., one patch for every four steps in code value) and by fitting a curve to the data, responses for intermediate code values may be approximated by evaluating the function. This is more accurate than linear interpolation. Thus, if the number of sample points is so large as to equal the number of code values in the printer's range and if the amount of noise is small, a curve-fit step may not be required at all.

After smoothing the measured data, a calibration transform is constructed having an input table, a grid table and an output table. The input and grid tables are identity transforms. The output table is, in substance, a look-up table that maps a first set of code values into a second set of code values according to the difference between the measured device characteristic (as represented by the smoothing function) and the aim for which the characterization was developed.

Considering a single channel as an example, the original characterization may have been based on an aim in which an interface code value of 100 generated a density of 0.45 for its cyan channel, but the response of an actual device to a code value of 100 gives a density of 0.50. Assume that the smooth curve representing the cyan device response indicates that a command value of 105 is required to achieve a density of 0.45 on this device. A calibration for this printer would map a cyan interface code value of 100 to a device code value of 105.

In this example, the characterization maps a color in u,v,L* space to a color in a CMYK space. Conceptually, the characterization transform is followed by a second transform: the calibration. The calibration maps the CMYK code values appropriate for the reference device into the CMYK code values appropriate for the user's device. As will be seen below, equivalent implementations result in a more computationally efficient mapping.

COMPOSITION OF CHARACTERIZATION AND CALIBRATION TRANSFORMS

An important variation of the present invention is the composition of a characterization and a calibration into a single, composite transformation, rather than a cascade of multiple transforms.

In the cascaded example above, a u,v,L* color was first transformed to an interface CMYK value (by the standard characterization) and then to a CMYK code value tuned to account for deviations from the reference (by the calibration). Instead, the characterization output table can be replaced by a table that produces tuned CMYK values without need of a second transformation. This is achieved by composing the two transforms in a manner taught in Ser. No. 07/832,358.

This three-table structure also allows for convenient composition of calibrated characterizations with other transforms into a single composite transform. Salient advantages of the composition process are: 1) application of a composite transform yields substantially the same result as sequential application of the individual transforms; and 2) a composite transform executes faster than the sequential application of the individual transforms. Thus, a user can further modify the calibrated characterization according to any of a wide variety of requirements, such as gamut mapping, color adjustment, tone correction, etc. Similarly, a previously modified transformation can be calibrated.

OTHER EXAMPLES OF CHARACTERIZATION CALIBRATION

Figure 8:
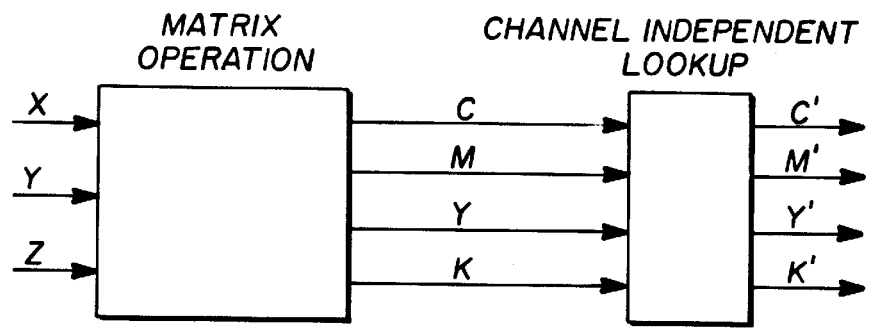
FIGS. 8 and 9 illustrate alternate transform structures suitable for calibration in accordance with the present invention.

Calibration of a characterization does not pertain exclusively to a three-table transform of the kind described above. The calibration of a characterization can be applied to any number of methods used to represent the characterization of a device. For example, a very simplistic characterization could be represented by a simple matrix, as shown in FIG. 8. Here, a matrix operation is a transform from colors represented in an input color space (X, Y, Z) into values represented in a space of colorants used for printing (CMYK). The channel-independent lookup is a transformation that maps one set of CMYK values to a new set according to an aim for the particular model or type of printer. In this case the printer is first calibrated to a desired aim using the channel-independent, one-dimensional transforms.

With the printer in this known state, a simple matrix can be derived to relate data in an input color space, such as XYZ, to the calibrated aim state of the printer. Then as the response of the printer drifts in time it can be corrected back to the aim state in which it was characterized by modifying the channel lookup or applying a further mapping.

Figure 9:
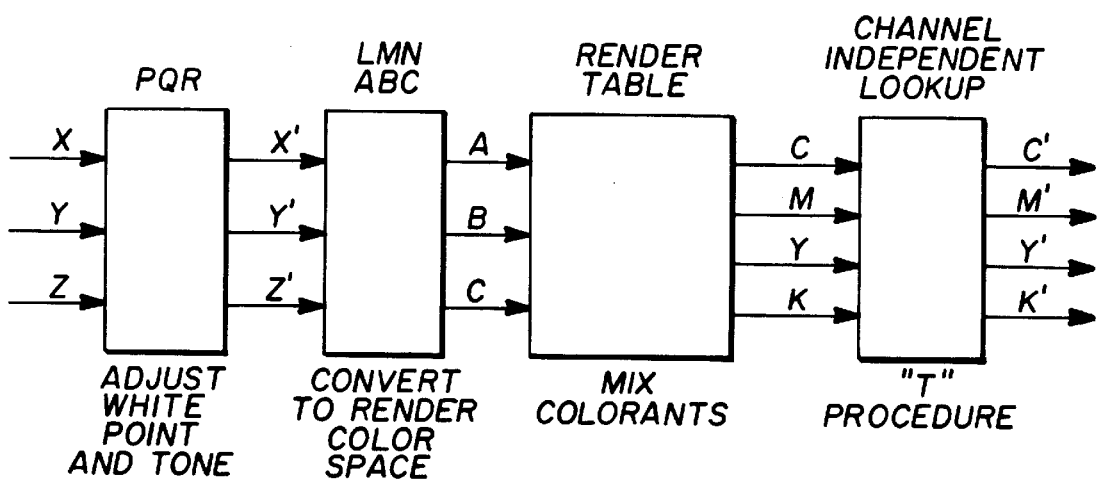

Another example of a characterization which could be calibrated using this technique would be a PostScript® level 2 color rendering dictionary as described in the 2nd edition of the PostScript® Language Reference Manual. In the PostScript® level 2 environment, there are number places where a channel independent process could be implemented prior to characterization. One of these is in the CIE based color rendering dictionary. The output processing path for PostScript® level 2 color rendering dictionaries contains the elements shown in FIG. 9.

In this example, PQR represented a tone-adjustment and white paint transform that maps an input of 3 color components (X, Y, Z) into another color (X', Y', Z') of the same color space. LMNABC represents a color transform from (X', Y', Z') color space to a space represented by a different set of base colors (A, B, C). The Render Table represents a transformation that maps colors from the (ABC) color space into colorants used by the printing device (CMYK).

At the end of this processing chain is a channel-independent operation (called the "T" procedure) which was designed to transform the interpolated, encoded components to device color component values. This T table could also be used to set the output device to a desired aim state. In the process of building the final rendering dictionary, the two aspects of the T table can be composed together to form a single table that does both the transformation of the interpolated, encoded components and the setting the device to a desired aim response. As the response of the device changes with time, the output color rendering dictionary could be updated with new T tables that put the device back on the desired aim.

In summary, device characterization that takes into account many aspects of the device (screening, dot gain, ink spectral reflectance . . . ) tends to require expensive, precision instrumentation not typically available to most end-users of a color system. Thus, a "factory" characterization for a particular model printer tends to be generated once "at the factory" of the printer manufacturer or by an aftermarket supplier of characterizations. However, the response of individual units of the same printer model may differ, and the response of a single printer may drift over time. Therefore, using a single "factory" characterization for all units of the same model may still result in variations. Using the method of the present invention, the user's system can be improved economically by providing a calibration capability which may be merged with the characterization, tuning the characterization for a specific user's device.

Another advantage of a calibration method as described above is that calibration can be completed independently of other parameters (such as the spectral reflectance of the inks). Colorant spectral reflectance is typically not recalibrated without use of expensive equipment unavailable to the average end-user. Thus, the end-user's system can be improved economically by providing a calibration capability which may be merged with the characterization, tuning the characterization for a specific user's device.

After learning of the embodiments described above, people practicing in this art will be able to make variations that fall within the spirit and scope of the invention. The embodiments described above are exemplary but not intended to limit the scope of the invention as defined by the following claims.

What is claimed is:

1. A method for adapting a color printer characterization, comprising:

defining a reference printer from among a family of printers and having a reference aim response;

characterizing the reference printer across channels of the reference printer to produce a reference characterization;

determining a calibration for each printer of the family against the reference aim response using each channel separately by:

printing a sequence of patches;

measuring responses of printed colors from the printed sequence of patches; and generating a calibration relationship between the measured responses and the reference aim response; and modifying the reference characterization using the calibration to produce an adapted characterization for each printer of the family by incorporating the calibration relationship into the characterization transform definition to form the adapted printer characterization;

wherein said printer characterization includes 1) input table data,
2) grid table data,
3) output table data,
4) size data specifying a size of one of the grid table's dimensions, and
5) identification data identifying the characterization as a transform definition.

2. The method of claim 1 wherein the calibration incorporation step includes a step of composing a calibration function with a characterization function.

3. The method of claim 1 wherein the calibration incorporation step includes a step of modifying a channel-independent table.

4. The method of claim 1 wherein the calibration incorporation step includes a step of replacing a channel-independent table.

5. The method of claim 1 wherein the calibration relationship generating step includes a step of fitting a curve to measured responses for a plurality of printed colors.

6. The method of claim 1 wherein the calibration relationship generating step includes a step of fitting a curve represented as a combination of basis functions to measured responses for a plurality of printed colors.

7. The method of claim 1 wherein the calibration relationship generating step includes a step of fitting a curve represented as a combination of B-spline curves to measured responses for a plurality of printed colors.

8. The method of claim 1 wherein the printing step includes a step of printing a target having a plurality of color patches.

9. The method of claim 1 wherein the calibration relationship generating step includes steps of:
   fitting a curve represented as combination of basis functions to measured responses for a plurality of printed colors; and
   evaluating the curve for colors other than those to which the curve was fit.

10. A method for adapting a printer characterization transform representing a color printer characterization, said printer characterization transform generating output values in response to input values, said adapting method comprising:
    defining a reference printer from among a family of printers and having a reference aim response;
    characterizing the reference printer across channels of the reference printer to produce a reference characterization;
    determining a calibration for each printer of the family against the reference aim response using each channel separately by:
        printing a target image having multiple target patches, differing target patches commanded to have different color densities;
        measuring color densities of printed target patches; and
        generating a calibration transform having a one-dimensional table for each color channel, each table incorporating a relationship between the aim response and measured color densities; and
    modifying the reference characterization using the calibration to produce an adapted characterization for each printer of the family by composing the calibration transform with the printer characterization transform to generate a single transform;
    wherein said composing step includes steps of:
        1) transforming printer characterization output values in accordance with said calibration transform to generate modified output values; and
        2) generating a single transform relating printer characterization input values to said modified output values, thereby adapting the printer characterization.

11. The method of claim 10 wherein the calibration transform generating step includes a step of fitting a curve to measured responses for a plurality of colors.

12. The method of claim 10 wherein the calibration transform generating step includes a step of fitting a curve represented as a combination of basis functions to measured responses for a plurality of colors.

13. The method of claim 10 wherein the calibration transform generating step includes a step of fitting a curve represented as a combination of B-spline curves to measured responses for a plurality of colors.

14. The method of claim 10 wherein the calibration transform generating step includes a step of fitting a curve represented as a combination of piecewise polynomials to measured responses for a plurality of colors.

15. The method of claim 10 wherein the calibration transform generating step includes steps of:
    fitting a curve to measured responses for a plurality of colors; and
    evaluating the curve for colors other than those to which the curve was fit.

16. A system, comprising:
    means for defining a reference printer from among a family of printers and having a reference aim response;
    means for characterizing the reference printer across channels of the reference printer to produce a reference characterization;
    an input for receiving an electronic representation of an image;
    processing means for processing values of the electronic representation of the image;
    an adapted printer generating a hardcopy of the electronic representation of the image, said adapted printer having a relationship between electronic command values and print density;
    a plurality of transform definitions in a shared format;
    a printer characterization and an adapted characterization, said printer characterization and said adapted characterization having the format of a transform definition and generating output electronic command values from input electronic command values prior to printing; and
    means for composing the characterization transform with a calibration transform to calibrate said printer characterization to produce the adapted characterization;
    wherein said composing means includes:
        1) means for transforming printer characterization output command values in accordance with a calibration transform to generate modified output command values for the adapted characterization, wherein said means for transforming includes:
            means for determining a calibration for the adapted printer against the reference aim response of the reference printer using each channel separately; and
            means for modifying said printer characterization using the calibration to produce said adapted characterization for said adapted printer; and
        2) means for generating a single transform relating adapted characterization input command values to said modified output values.

17. The system of claim 16 wherein the characterization calibration means includes means for generating a calibration transform.

18. The system of claim 17 further including means for sequentially applying the characterization and the calibration transform to an image.

19. The system of claim 16 wherein the characterization calibration means includes means for fitting a curve to measured responses for a plurality of colors.

20. The system of claim 16 wherein the characterization calibration means includes:
    means for fitting a curve to measured responses for a plurality of colors; and means for generating a calibration transform by evaluating the curve.

21. A method of adapting a color printer characterization, comprising:

defining a reference first printer having a reference aim response;

characterizing the first printer across channels of the reference printer to produce a reference characterization;

determining a calibration of a second printer against the reference aim response using each channel separately by:

printing a sequence of patches;

measuring responses of the patches; and generating a calibration relationship between the measured responses and the reference aim response; and incorporating the calibration relationship into a characterization transform definition of the characterization modifying the reference characterization using the calibration to produce an adapted characterization for the second printer.

* * * * *